(12) United States Patent
Fujioka et al.

(10) Patent No.: US 11,028,827 B2
(45) Date of Patent: Jun. 8, 2021

(54) OPERATING WIND TURBINE ABOVE RATING DURING LOW EROSION CONDITIONS

(71) Applicant: MHI VESTAS OFFSHORE WIND A/S, Aarhus N (DK)

(72) Inventors: Hideyasu Fujioka, Århus C (DK); Alex Pericleous, Surrey (GB)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 126 days.

(21) Appl. No.: 16/461,591

(22) PCT Filed: Nov. 17, 2017

(86) PCT No.: PCT/DK2017/050380
§ 371 (c)(1),
(2) Date: May 16, 2019

(87) PCT Pub. No.: WO2018/091057
PCT Pub. Date: May 24, 2018

(65) Prior Publication Data
US 2019/0368466 A1 Dec. 5, 2019

(30) Foreign Application Priority Data
Nov. 18, 2016 (DK) .............................. PA201670917

(51) Int. Cl.
*F03D 7/02* (2006.01)
*F03D 17/00* (2016.01)
(Continued)

(52) U.S. Cl.
CPC ......... *F03D 7/0224* (2013.01); *F03D 7/0264* (2013.01); *F03D 7/0276* (2013.01);
(Continued)

(58) Field of Classification Search
CPC ............. F05B 2270/323; F03D 7/0268; F03D 7/0292; F03D 7/00–06
See application file for complete search history.

(56) References Cited

U.S. PATENT DOCUMENTS 6,837,681 B2 * 1/2005 Wobben ................ F03D 7/0276
416/1
7,934,905 B2 * 5/2011 Eggleston ............... F03D 17/00
416/61
(Continued)

FOREIGN PATENT DOCUMENTS

CN 102536630 A 7/2012
CN 106089578 A 11/2016
(Continued)

OTHER PUBLICATIONS

Keegan, M. Wind Turbine Blade Leading Edge Erosion: An investigation of rain droplet and hailstone impact induced damage mechanisms. Doctoral Thesis, University of Strathclyde, 2014. (Year: 2014).*
(Continued)

*Primary Examiner* — Eldon T Brockman
*Assistant Examiner* — Topaz L. Elliott
(74) *Attorney, Agent, or Firm* — Patterson + Sheridan, LLP (57) ABSTRACT

There is presented a method (320) for controlling a wind turbine (100), wherein said wind turbine comprises a wind turbine rotor (102) with one or more blades (103), wherein the wind turbine has a rated angular rotation speed (214) of the wind turbine rotor, said method comprising obtaining (322) information (323) on ambient conditions, determining, based on said information, if an erosion criterion is fulfilled, controlling (328) the wind turbine according to an extended mode if the erosion criterion is fulfilled, wherein in the
(Continued)

extended mode an angular rotation speed of the wind turbine rotor is allowed to exceed the rated angular rotation speed (214).

20 Claims, 3 Drawing Sheets

(51) Int. Cl.
  *F03D 7/04* (2006.01)
  *F03D 1/00* (2006.01)
(52) U.S. Cl.
  CPC .............. *F03D 7/042* (2013.01); *F03D 17/00* (2016.05); *F03D 1/00* (2013.01); *F05B 2240/221* (2013.01); *F05B 2260/74* (2013.01); *F05B 2260/83* (2013.01); *F05B 2270/101* (2013.01); *F05B 2270/30* (2013.01); *F05B 2270/804* (2013.01)

(56) References Cited

U.S. PATENT DOCUMENTS

| | | | | |
|---|---|---|---|---|
| 8,388,315 | B2* | 3/2013 | Haans | F03D 80/55 416/1 |
| 9,581,165 | B2* | 2/2017 | Babbitt | A01M 29/00 |
| 2003/0165379 | A1* | 9/2003 | Wobben | F03D 7/0264 415/1 |
| 2010/0054940 | A1* | 3/2010 | Honhoff | F03D 7/022 416/31 |
| 2012/0061957 | A1* | 3/2012 | Steinmetz | F03D 7/043 290/44 |
| 2013/0161955 | A1 | 6/2013 | Dalsgaard et al. | |
| 2013/0270827 | A1* | 10/2013 | Couchman | F03D 7/028 290/44 |
| 2014/0186188 | A1* | 7/2014 | Takeuchi | F03D 1/0675 416/224 |
| 2014/0203563 | A1* | 7/2014 | Bowyer | F03D 7/047 290/44 |
| 2014/0358592 | A1* | 12/2014 | Wedig | G06Q 40/08 705/4 |
| 2015/0115608 | A1* | 4/2015 | Draper | F03D 80/82 290/44 |
| 2015/0184631 | A1* | 7/2015 | Woo | F03D 80/80 290/44 |
| 2017/0241405 | A1* | 8/2017 | Kruger | F03D 7/048 |
| 2019/0345915 | A1* | 11/2019 | Picard | F03D 7/0276 |
| 2020/0056585 | A1* | 2/2020 | Messing | F03D 7/043 |

FOREIGN PATENT DOCUMENTS

| | | | |
|---|---|---|---|
| DE | 102014226979 A1 | 6/2016 | |
| WO | WO-2012100783 A2 * | 8/2012 | ............ F03D 15/00 |
| WO | 2015032409 A1 | 3/2015 | |
| WO | 2016023554 A1 | 2/2016 | |
| WO | 2018091057 A1 | 5/2018 | |

OTHER PUBLICATIONS

Bech, J. "Extending the life of wind turbine blade leading edges by reducing the tip speed during extreme precipitation events", Wind Energ. Sci., 3, 729-748, 2018 https://doi.org/10.5194/wes-3-729-2018 (Year: 2018).*
"WIND turbine COntrol strategies to reduce wind turbine blade Rain droplet Erosion (WINDCORE)" https://www.grow-offshorewind.nl/project/windcore (Year: 2020).*
Boone, T. "PTAB Establishes Plain Meaning of 'At Least One of A and B'" retrieved from https://www.bipc.com/ptab-establishes-plain-meaning-of-at-least-one-of-a-and-b on Nov. 30, 2020 (Year: 2020).*
Danish Patent Office First Technical Examination for Application No. PA 2016 70917 dated Aug. 24, 2017.
PCT International Search Report for Application No. PCT/DK2017/050380 dated May 2, 2018.
PCT Written Opinion of the International Searching Authority for Application No. PCT/DK2017/050380.
Chinese Office Action for Application No. 201780070848.3 dated Mar. 4, 2020.

* cited by examiner

OPERATING WIND TURBINE ABOVE RATING DURING LOW EROSION CONDITIONS

FIELD OF THE INVENTION

The present invention relates to a method for controlling a wind turbine, more particularly a method for controlling a wind turbine for increasing angular rotation speed in ambient conditions where such increase can be allowed without rapid increase in mechanical damage of the blades, a corresponding control system, software and wind turbine.

BACKGROUND OF THE INVENTION

A wind turbine, such as an offshore wind turbine, as known in the art comprises a wind turbine tower and a rotor. The rotor comprises one or more rotor blades, which may suffer from mechanical damage caused by precipitation, such as rain.

U.S. Pat. No. 6,837,681 B2 describes that the rotor blades carried thereby of wind power installations are subjected to a particular degree to the ambient environmental influences such as for example rain, snow, hail or also insects. In particular the leading edges of the rotor blades are heavily loaded in that respect. In that situation it can happen that the rotor blades and in particular the leading edges thereof, after some time, suffer from (mechanical) damage, for which cost-intensive repair is necessary, especially as a crane is frequently required for that purpose and the entire wind power installation is also stopped for a prolonged period due to the repair and under some circumstances even individual rotor blades have to be transported away to the repair location. The object of U.S. Pat. No. 6,837,681 B2 is to reduce the erosion damage at the rotor blades and to avoid the above-mentioned disadvantages. U.S. Pat. No. 6,837,681 B2 describes a method of operating a wind power installation having at least one sensor for detecting the number and/or the speed and/or the impulse of particles which impinge on the sensor, with a data processing and control device for processing the measurement data detected by the sensor, wherein the rotary speed (which may be referred to interchangeably with angular rotation speed) of the rotor of the wind power installation is reduced (by means of the data processing/control device) and/or the wind power installation is stopped if a particle measurement value measured by the sensor is exceeded. However, that also results in a reduction in the total power which the wind power installation produces.

An improved method for operating a wind turbine would be advantageous, and it would in particular be advantageous with a method which enables increasing power production of the wind turbine while simultaneously avoiding increases in the rate of mechanical damage or at least avoiding too large increases in the rate of mechanical damage.

The present invention may be applicable to offshore wind turbines.

SUMMARY OF THE INVENTION

It may be seen as an object of the present invention to provide a method for controlling a wind turbine that solves or mitigates the above mentioned problems, by enabling increasing power production of the wind turbine while simultaneously avoiding increases in the rate of mechanical damage or at least avoiding too large increases in the rate of mechanical damage.

The above described object is intended to be obtained in a first aspect of the invention by providing a method for controlling a wind turbine, wherein said wind turbine comprises:

A wind turbine rotor with one or more blades, wherein the wind turbine has a rated angular rotation speed of the wind turbine rotor, said method comprising:

Obtaining information on ambient conditions,

Determining, based on said information, if an erosion criterion is fulfilled,

Controlling the wind turbine according to an extended mode if the erosion criterion is fulfilled, wherein in the extended mode an angular rotation speed of the wind turbine rotor is allowed to exceed the rated angular rotation speed.

The invention is particularly, but not exclusively, advantageous for obtaining a method for enabling increasing angular rotation speed (and thus increased energy production) without said increase simultaneously entails an unacceptable increase in erosion rate, which could in turn entail an unacceptable decrease in blade leading edge lifetime. More particularly, the inventive method obtains information on ambient conditions, which enables identifying if an erosion criterion is fulfilled so that the angular rotation speed could be increased without detrimentally increasing erosion rate thereby decreasing blade lifetime.

By 'angular rotation speed (of the wind turbine rotor)' ($\omega$) may be understood the number of turns of the rotor divided by time at any given instant, which may be measured in radians per second (rad/s). The relation between angular rotation speed ($\omega$) and rotor tip speed (v) is given by $$v = r * \omega,$$

where r is the radius of the rotor. Angular rotation speed could alternatively be measured in revolutions per minute (rpm).

By 'rated angular rotation speed (of the wind turbine rotor)' ($\omega_{rated}$) may be understood the maximum allowed angular rotation speed (such as in the normal mode), which is a fixed value (as opposed to the angular rotation speed). The rated angular rotation speed may take on a fixed value, for example a value set when the turbine is designed.

By 'information on ambient conditions' may be understood information relating to the atmosphere surrounding the wind turbine, such as including information on one or more of:

Precipitation, such as:
  Type of precipitation (e.g., rain, hail, graupel, snow),
  intensity of precipitation (e.g., measured in units of mm/hour),
  particle size (e.g., rain drop size),
suspended aqueous particles, such as fog or mist, wherein said information may relate to type and/or concentration,
non-aqueous particles, such as dust or sand or aerosols, wherein said information may relate to type and/or concentration,
humidity,
Insects.

According to an embodiment there is presented a method wherein said precipitation intensity is defined as an accumulated amount of precipitation, such as rain, per unit of time, which precipitation intensity is measured as height during a predetermined period of time, such as 10 minutes.

By 'obtaining information on ambient conditions' may be understood receiving (such as via a weather forecast or weather report) or measuring (such as via one or more sensors).

By 'erosion criterion' may be understood a predetermined criterion related to an estimated degree of erosion, which may be directly or indirectly associated with the information on ambient conditions. For example, the erosion criterion may be directly related with the information on ambient conditions if the criterion is fulfilled with a certain rain drop size. For example, the erosion criterion may be indirectly related with the information on ambient conditions if a value is derived at least partially from said information (e.g., if an erosion rate is calculated at least partially based on the information on ambient conditions) and then the erosion criterion is fulfilled if the value is above or below a certain threshold (e.g., if an estimated erosion rate is below an erosion rate threshold). The erosion criterion may for example be fulfilled in case of absence of rain, absence of hail, rain drop frequency being below a predetermined rain drop frequency threshold, levels of particulates in air being below a predetermined treshold particulate level, an average rain drop size being below a predetermined rain drop size threshold, an estimated erosion rate being below a predetermined erosion rate threshold, and/or an incubation period being above a predetermined incubation period threshold.

In general, if the erosion criterion is fulfilled, then the risk of erosion may be relatively low compared to a situation where the erosion criterion is not fulfilled.

By 'extended mode' may be understood a mode according to which the wind turbine may be operated, which mode is different to at least one other mode, which at least one other mode may be referred to as a normal mode, wherein in the normal mode the angular rotation speed of the wind turbine rotor is limited by the rated angular rotation speed, and may take on values only up to the rated angular rotation speed. It may in general be understood, that in the normal mode, the angular rotation speed is not allowed to exceed the rated angular rotation speed and will remain at the rated angular rotation speed for wind speeds at least in the range from the rated wind speed and up to the cut-out wind speed, such as in a range from slightly below the rated wind speed and up to a cut-out wind speed. It may in general be understood, that in the extended mode an angular rotation speed of the wind turbine rotor is allowed to exceed the rated angular rotation speed, such as wherein an angular rotation speed of the wind turbine exceeds the rated angular rotation speed for wind speeds exceeding a rated wind speed, such as for a range from a rated wind speed and up to a cut-out wind speed.

In an embodiment, there is presented a method wherein the information on ambient conditions comprises information on rain drops impinging on the one or more blades or being likely to impinge on the one or more blades, and wherein the method is comprising:

Determining that the erosion criterion is fulfilled if an average drop size of said rain drops are below a predetermined rain drop size threshold.

An erosion rate may be proportional to drop size, thus an advantage of this method may be that it realizes a very simple method for identifying a scenario wherein angular rotation speed may be increased without detrimentally increasing erosion rate. In case of no rain drops (e.g., dry weather) the average rain drop size is understood to be zero.

In an further embodiment, the erosion criterion may be fulfilled in case of:
Absence of hail,
Rain drop frequency below a predetermined rain drop frequency threshold, and/or
Levels of particulates in air below a predetermined threshold particulate level.

In an embodiment, there is presented a method wherein the information on ambient conditions enables estimating an estimated erosion rate, and wherein the method is comprising:

Estimating, based on said information, the estimated erosion rate,
Determining that the erosion criterion is fulfilled if the estimated erosion rate is below a predetermined erosion rate threshold.

The present method enables identifying if an erosion rate (such as an erosion rate corresponding to the angular rotation speed being at or above the rated angular rotation speed), is so low that the angular rotation speed could be increased without detrimentally increasing erosion rate thereby decreasing blade lifetime.

By 'erosion rate' may be understood an erosion rate of leading edges of the blades, such as leading edges of the tips (where speed is highest) of the blades. The erosion rate may be given in units of kg/second/m$^2$.

By 'enables estimating an estimated erosion rate' may be understood that said information on ambient conditions—optionally together with operating parameters (such as angular rotation speed or rated angular rotation speed) and/or structural information on the wind turbine (such as rotor diameter and/or blade leading edge material)—allows a system and/or a user to estimate the erosion rate, such as the erosion rate of the tip of the leading edge of the blades at the rated angular rotation speed. It may in particular be understood, that the 'information on ambient conditions (which) enables estimating an estimated erosion rate' corresponds to at least parameters in a parameterization (such as a formula) for erosion rate, which relates to the ambient conditions (such as where it is understood that any remaining parameters, e.g., related to angular rotation speed, rotor diameter and blade leading edge material, are also available).

By 'a predetermined erosion rate threshold' may be understood a fixed value (as opposed to the erosion rate), which allows comparison with the estimated erosion rate.

In an embodiment, there is presented a method wherein the information on ambient conditions enables estimating an incubation period, and wherein the method is comprising:

Estimating, based on said information, the incubation period,
Determining that the erosion criterion is fulfilled if the incubation period is above a predetermined incubation period threshold.

Incubation time $t_{ic}$ is determined according to a formula given as:

$$t_{ic} \text{ (such as in units of hours [hr])} \propto I^{-1} I^{\alpha} * V_t^{\beta} * (V * \cos(\theta))^{\gamma} * d^{\xi}$$

wherein:
$t_{ic}$ (such as in units of hours [hr]) represents incubation time,
I (such as in units of millimeter/hour [mm/hr]) represents precipitation intensity (accumulated amount of rainfall per time),
$V_t$ (such as in units of meters per second [m/s]) represents rain drop terminal speed,
V (such as in units of meters per second [m/s]) represents rain drop impact speed, θ (such as in units of radians [rad]) represents rain drop impact angle, d (such as in units of millimeters [mm]) represents rain drop diameter, α is a constant, such as 1, β is a constant, such as −1, γ is a constant, such as within 6 to 7, such as 6 or 6.05 or 6.7 or 7, ζ is a constant, such as −1 or within 2.3-3.

By 'incubation time' is in this context understood the time after a rainfall starts wherein a weight loss of a material, e.g., of a blade tip, subjected to repeated impingements of rain droplets is no longer insignificant. Thus, there is a period, which may be referred to as incubation period, from the rainfall starts and until the incubation time, wherein the weight loss of the material is insignificant. The constants α, β, γ, ζ may take on values such as (α, β, γ, ζ)=(1, −1, 6.7, −1) or (α, β, γ, ζ)=(1, −1, 6.5, 2.5).

Formulas enabling deriving the formula for incubation time and/or erosion rate may be found in the book entitled "*Erosion by liquid impact*", by author Springer, George S., publisher Scripta Pub. Co., 1976, which is hereby incorporated by reference in entirety, and reference is in particular made to chapter 1 ("*General considerations*"), chapter 2 ("*Erosion of homogeneous materials*") and more particularly TABLE 2-2 with a summary of derived results.

In a second aspect, the invention relates to a computer program product that includes a non-transitory computer-readable medium having instructions which, when executed by one or more processors cause a computing device or a control system for a wind turbine to perform the method according to the first aspect.

In a third aspect, the invention relates to a control system for a wind turbine being arranged for carrying out the method according to the first aspect.

In a fourth aspect, the invention relates to a wind turbine, such as an offshore wind turbine, comprising the control system according to the third aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
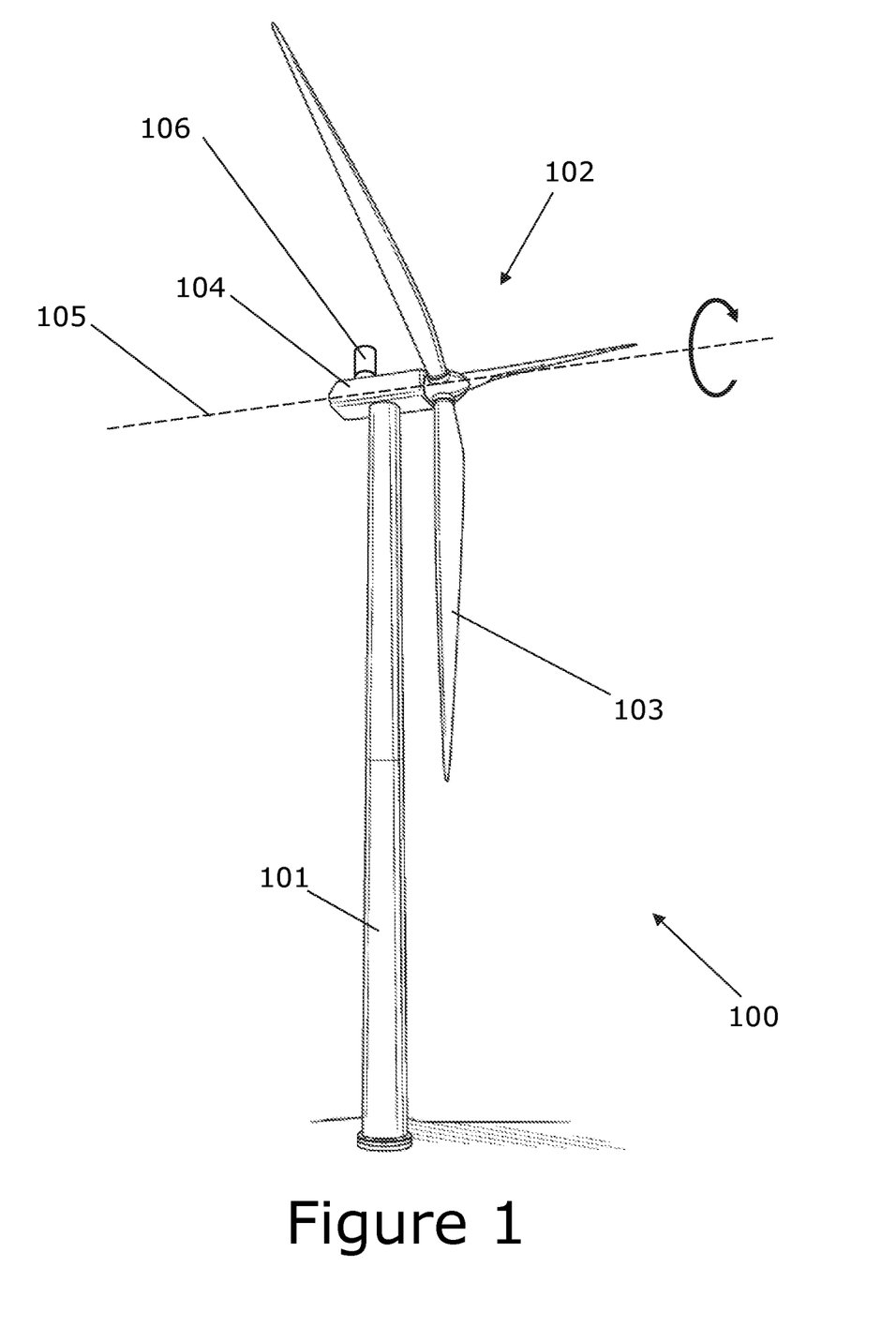
FIG. 1 shows a wind turbine.

FIG. 1 shows a wind turbine 100 according to the fourth aspect, wherein said wind turbine is comprising a wind turbine rotor 102 with one or more blades 103, such as three blades, a generator configured to be driven by rotational energy of the wind turbine rotor.

In the specific embodiment, the depicted wind turbine 100 (which may also be referred to as a wind turbine generator (WTG)) is also comprising a tower 101. The rotor is connected to a nacelle 104, which is mounted on top of the tower 101 and being adapted to drive a generator situated inside the nacelle. An optical rain gauge 106 is placed on top of the nacelle. The wind turbine rotor 102 is rotatable around a rotor axis 105 by action of the wind. The wind induced rotational energy of the blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g., in order to maximize uptake of the wind energy and to ensure that the rotor blades are not subjected to too large loads when strong winds are blowing. The wind turbine 100 comprises a control system being arranged to determine a pitch signal and may be implemented in a general controller for a wind turbine or a control element, such as a dedicated pitch controller, e.g., where the blades are pitched individually by a pitch system with a pitch force system controlled by a pitch control system, where the pitch force system includes actuators, such as hydraulic actuators, for individually pitching the blades dependent on a pitch signal from the pitch control system, such as the pitch signal comprising one or more individual blade pitch angle control signals corresponding to one or more respective blades.

Figure 2:
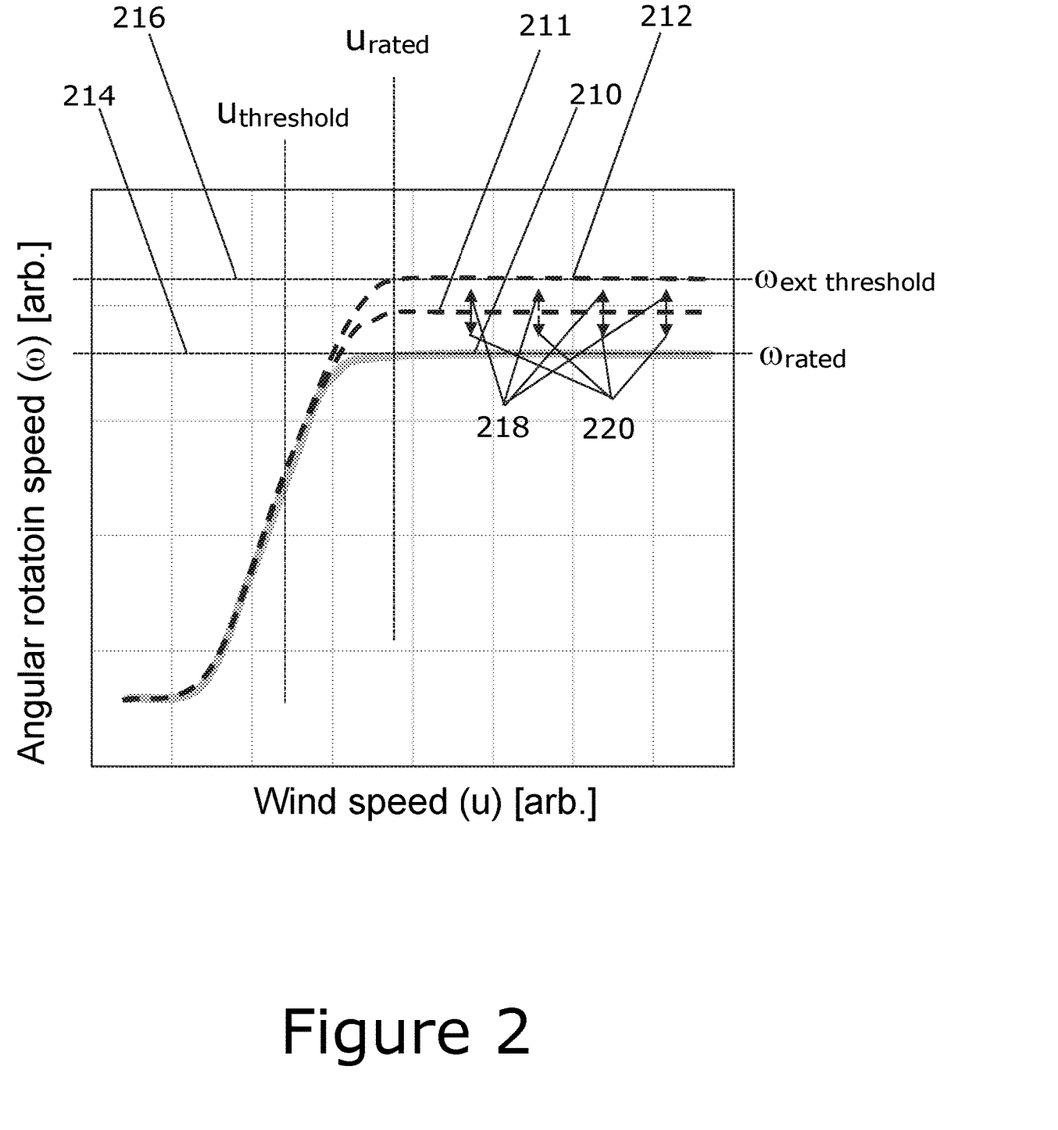
FIG. 2 is a graph with angular rotation speed according to, respectively, normal mode and extended mode.

FIG. 2 is a graph with angular rotation speed (ω) as a function of wind speed (u), according to, respectively, normal mode and extended mode. In the normal mode, the angular rotation speed (here shown in arbitrary units (arb.), but it could be quantified in, e.g., revolutions per minute (rpm)) is controlled as function of wind speed (here shown in arbitrary units (arb.), but it could be quantified in, e.g., meters/second (m/s)) according to the (full drawn, thick, grey) normal mode curve 210. In the extended mode, the angular rotation speed is controlled as function of wind speed according to the (dashed, thin, black) extended mode curve 211, which for optimum situations with ambient conditions providing very low erosion conditions may use an angular rotation speed up to (or just below) the angular rotation speed threshold, $\omega_{ext\ threshold}$, 216. This situation corresponds to optimum extended mode curve, 212. When operating in the extended mode, the high wind angular rotation speed of the extended mode curve is set above the rated angular rotation speed, $\omega_{rated}$, 214 and below the angular rotation speed threshold dependent on the actual erosion conditions. For example conditions where no precipitation is forecasted or observed but non-aqueous particles (such as sand particles) are present at a high level, may lead to an intermediate erosion situation where the extended mode angular rotation speed at high wind is set between the rated angular rotation speed and the angular rotation speed threshold. If ambient conditions improve, the extended mode angular rotation speed curve 211 may be shifted upwards towards curve 212 as indicated by arrows 218; if ambient conditions deteriorate, the extended mode angular rotation speed curve 211 may be shifted downwards (towards 210) as indicated by arrows 220.

It is in particular noticed that in the extended mode the angular rotation speed is allowed to exceed the rated angular rotation speed.

In general in the extended mode an angular rotation speed of the wind turbine exceeds the rated angular rotation speed for wind speeds exceeding a rated wind speed, but in the present embodiment the rated angular rotation speed is exceeded already at wind speeds below the rated wind speed.

According to an embodiment there is presented a method wherein in the extended mode the angular rotation speed of the wind turbine rotor is limited below an angular rotation speed threshold (216), wherein the angular rotation speed threshold is larger than the rated angular rotation speed of the wind turbine.

An advantage of this may be that keeping the angular rotation speed below a threshold may ensure structural integrity of the wind turbine, such as preserve an acceptable lifetime of the wind turbine.

By 'angular rotation speed threshold (of the wind turbine rotor)' ($\omega_{extended}$) is understood the maximum allowed angular rotation speed (in extended mode), which is a fixed value (as opposed to the angular rotation speed), which is larger than the rated angular rotation speed.

Figure 3:
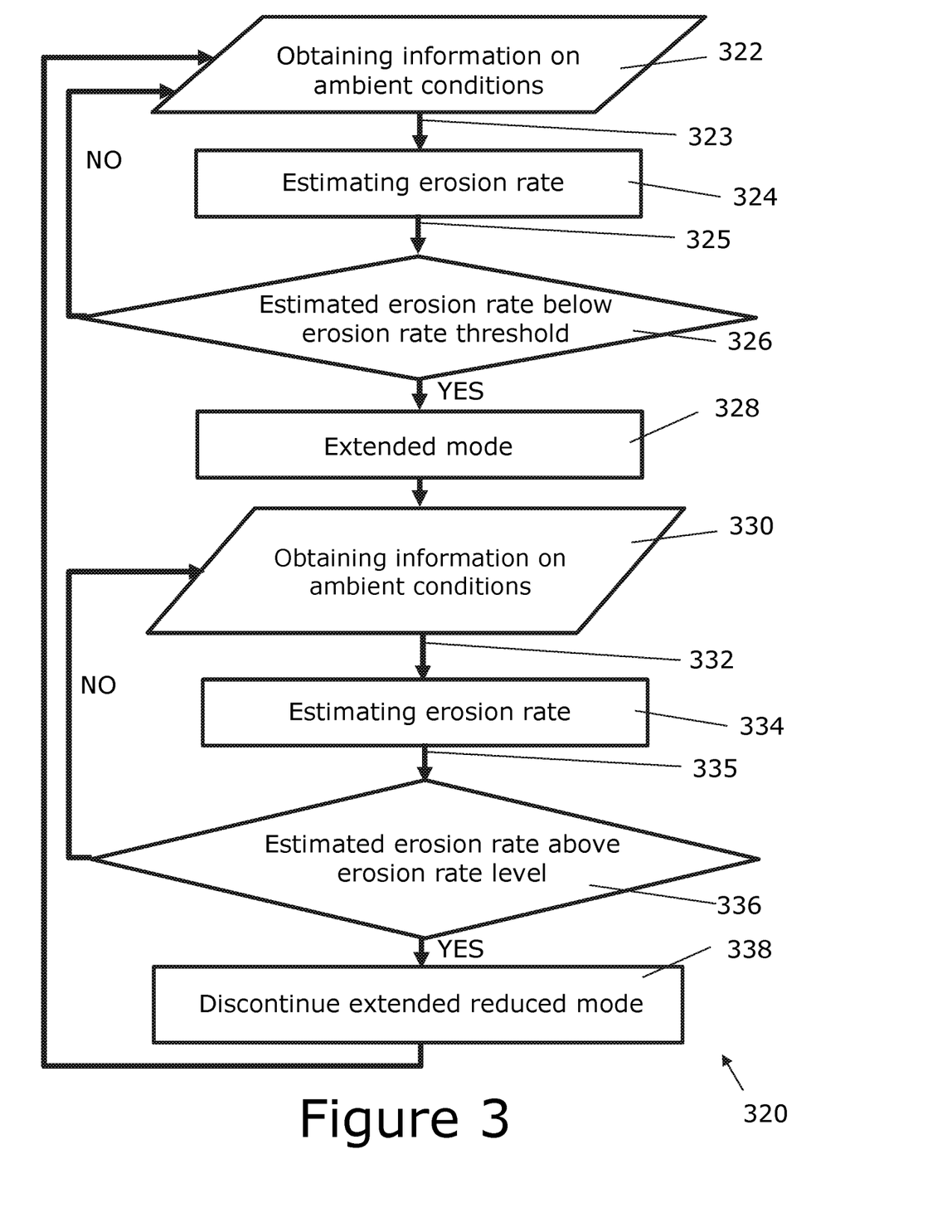
FIG. 3 shows a flow-chart according to an embodiment of the invention.

According to an embodiment there is presented a method wherein the angular rotation speed threshold 216 is:
- inversely proportional to the estimated erosion rate 325, and/or
- set so as to maintain a constant erosion rate, such as so as to give a certain probability of reaching a given lifetime of the leading edges of the blade tips, and/or
- set according to a pre-calculated lookup table, such as a pre-calculated lookup table relating estimated erosion rate and maxium tip speed, and/or
- set according to a maximum corresponding structural load (optionally set via online calculations or pre-calculated and inserted in a look-up table), such as the structural load (such as thrust loading, cyclic loading, load on drivetrain) corresponding to the angular rotation speed threshold is at or below a maximum acceptable structural load on one or more of the wind turbine components, and/or
- set according to a noise level (such as the maximum acceptable noise level at the nearest neighbour, or at the neighbouring turbine in a wind turbine park).

According to a further embodiment there is presented a method wherein said angular rotation speed threshold (216) is more than 102%, such as more than 105% (such as within 105-110%), such as more than 110%, such as more than 125%, with respect to the rated angular rotation speed.

According to the embodiment depicted in FIG. 2, in case of wind speeds below a certain wind speed value ($u_{threshold}$) the angular rotation speed of the extended mode is the same as the normal mode. However, above said certain wind speed ($u_{threshold}$) the angular rotation speed is controlled differently in normal mode and extended mode, and in particular limited by different maximum values, respectively, the rated angular rotation speed ($\omega_{rated}$) as indicated by lower dotted curve 214 and the angular rotation speed threshold ($\omega_{extended}$) as indicated by upper dotted curve 216. For wind speeds above another certain wind speed value, the rated wind speed ($u_{rated}$) the angular rotation speed is kept constant at the respective maximum values.

FIG. 3 shows a flow-chart according to an embodiment of the invention, more particularly a method 320 for controlling a wind turbine 100, wherein said wind turbine comprises:
- A wind turbine rotor 102 with one or more blades 103, wherein the wind turbine has a rated angular rotation speed 214 of the wind turbine rotor, said method comprising:
- Obtaining 322 information 323 on ambient conditions, which information enables estimating an estimated erosion rate,
- Estimating 324, based on said information 323, the estimated erosion rate 325,
- Determining 326 if the estimated erosion rate 325 is below a predetermined erosion rate threshold,
- Controlling 328 the wind turbine according to an extended mode if the estimated erosion rate 325 is below a predetermined erosion rate threshold, wherein in the extended mode an angular rotation speed of the wind turbine rotor is allowed to exceed the rated angular rotation speed.

In the particular embodiment shown, the steps 322-326 may be repeated a plurality of times, such as continuously checking if the erosion criterion is fulfilled, such as continuously monitoring the erosion rate.

It may be understood that the steps of estimating 324 and determining 326 is an embodiment of the more general step of determining, based on said information, if an erosion criterion is fulfilled.

According to the embodiment illustrated in the flow-chart wherein the method further comprises
- Controlling 328 the angular rotation speed according to the extended mode,
- Subsequently obtaining 330 subsequent information 332 on ambient conditions, which information enables estimating a subsequently estimated erosion rate,
- Subsequently estimating 334, based on said subsequent information, the subsequently estimated erosion rate 335,
- Determining 336 if the subsequently estimated erosion rate 335 is above a predetermined erosion rate level
- Discontinue controlling 338 the wind turbine according to the extended mode if the subsequently estimated erosion rate 335 is above a predetermined erosion rate level, such as if the subsequently estimated erosion rate 335 exceeds the predetermined erosion rate level then extended mode is discontinued and operation is carried out according to normal mode, such as wherein the angular rotation speed of the turbine will be set back to the (original) rated rotational speed (for example in case of wind speed above rated wind speed).

An advantage of the subsequent steps 330-338 may be that they enable discontinuing operation according to the extended mode.

In the particular embodiment shown, the steps 330-338 may be repeated a plurality of times, such as continuously monitoring the erosion rate, such as continuously adjusting the angular rotation speed based upon the (subsequently) estimated erosion rate.

The a predetermined erosion rate level may be similar or different with respect to the predetermined erosion rate threshold.

According to an embodiment there is presented a method wherein an amount of power produced at an angular rotation speed above the rated angular rotation speed is higher than an amount of power produced at the rated angular rotation speed. In a more particular embodiment, the produced power increases with angular rotation speed (such as for wind speeds within a range from rated wind speed to cut-out wind speed) so that when angular rotation speed is increased (such as increased beyond the rated angular rotation speed) the electrical power of the turbine may also be increased. An advantage of this may be that it allows maximizing the power production when the power production (where Power P is given by P=M*ω, with M being torque and ω being angular rotation speed) is limited by gearbox torque, so for a torque limited turbine if angular rotation speed is increased (such as increased beyond rated angular rotation speed) a given percentage, then an increase in electrical power produced may be increased by the same percentage.

According to an embodiment there is presented a method wherein the estimated erosion rate is inversely proportional to, such as the reciprocal of, estimated lifetime of leading edges of tips of the wind turbine blades, wherein said estimated lifetime is estimated based on said information and an angular rotation speed of the wind turbine rotor corresponding to the rated angular rotation speed. Thus, the erosion rate may be estimated by estimating the lifetime based on said information (on ambient conditions) and assuming the angular rotation speed being the rated angular rotation speed, and the taking the reciprocal of said lifetime. Estimated lifetime may be estimated by calculating the incubation period and equating the estimated lifetime with the calculated incubation period.

According to an embodiment there is presented a method wherein the information on ambient conditions comprises information on one or more of:
  Solid particles in air surrounding the wind turbine, such as solid particles being likely to impinge on the blades,
  Liquid particles in air surrounding the wind turbine, such as liquid particles being likely to impinge on the blades,
  Humidity.

According to an embodiment there is presented a method wherein the information on ambient conditions comprises information on rain drops or hailstones impinging on the one or more blades or being likely to impinge on the one or more blades.

According to an embodiment there is presented a method wherein obtaining (322) said information comprises any one or more of:
  Providing one or more sensors and receiving data from said one or more sensors, such as said one or more sensors comprising
    a precipitation sensor, such as:
      A rain gauge, such as
        an optical rain gauge (106), or
        an acoustic rain gauge,
    a humidity sensor,
  Receiving a weather report,
  Receiving a weather forecast, or
  Receiving data and/or a forecast from another wind turbine (which may be a neighboring turbine, a turbine in the same wind turbine park or another turbine), a substation (such as a substation of a wind turbine park that the wind turbine (100) forms a part of or a substation of a nearby wind turbine park), or a remote control center (such as a control center controlling a number of wind turbines or wind turbine parks).

Said one or more sensor may in embodiments, be anyone of:
  One or more sensors on the wind turbine,
  one or more sensors placed next to the wind turbine, e.g., on a neighbouring wind turbine in a wind turbine park.
  one or more sensors placed remotely with respect to the wind turbine.

According to an embodiment there is presented a method wherein said wind turbine (100) further comprises:
  a pitch control system for controlling a pitch angle of the one or more blades (103),
  and wherein the method further comprises:
    controlling the angular rotation speed by controlling the pitch angle of the one or more blades with the pitch control system.

Alternatively, or in addition to pitching, it may also be possible to control the angular rotation speed of the wind turbine by using a power/torque demand on the generator. This may for example be applied to control angular rotation speed at low wind speeds.

According to an embodiment there is presented a method wherein obtaining 322 information 323 on ambient conditions comprises a measurement with one or more of:
  A rain gauge,
  An optical rain gauge 106,
  an acoustic rain gauge.

An optical rain gauge may have a row of collection funnels. In an enclosed space below each is a laser diode and a photo transistor detector. When enough water is collected to make a single drop, it drops from the bottom, falling into the laser beam path. The sensor is set at right angles to the laser so that enough light is scattered to be detected as a sudden flash of light. The flashes from these photo detectors are then read and transmitted or recorded.

An acoustic rain gauge (also referred to as a hydrophone) may be able to sense the sound signatures for each drop size as rain strikes a water surface within the gauge. Since each sound signature is unique, it is possible to invert the underwater sound field to estimate the drop-size distribution within the rain.

In general, a sensor being any one of a rain gauge, such as an optical or acoustic rain gauge, may be installed on the wind turbine, such as on top of the nacelle. However, the sensor does not need to be installed on the wind turbine, it could for example be installed next to the wind turbine or on a neighbouring wind turbine.

According to an embodiment the wind turbine 100 further comprises:
  a pitch control system for controlling a pitch angle of the one or more blades 103,
  and wherein the method further comprises:
    controlling the angular rotation speed by controlling the pitch angle of the one or more blades with the pitch control system.

Other ways of controlling angular rotation speed are conceivable, such as via generator torque, which could be employed at least in some instances (for example below rated wind speed).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine comprising a wind turbine rotor with one or more blades, wherein the wind turbine has a rated angular rotation speed of the wind turbine rotor, wherein the method comprises:
obtaining information on ambient conditions comprising information on rain drops impinging on the one or more blades or information on rain drops being likely to impinge on the one or more blades,
determining that an erosion criterion is fulfilled when a physical characteristic of said rain drops satisfies a predetermined threshold, and
controlling the wind turbine according to an extended mode upon determining the erosion criterion is fulfilled, wherein in the extended mode, an angular rotation speed of the wind turbine rotor is allowed to exceed the rated angular rotation speed.

2. The method according to claim 1, wherein the physical characteristic is
an average drop size of said rain drops.

3. The method according to claim 1, wherein the information on ambient conditions enables estimating an estimated erosion rate, and wherein the method further comprises:
estimating, based on said information, the estimated erosion rate,
determining that the erosion criterion is fulfilled if the estimated erosion rate is below a predetermined erosion rate threshold.

4. The method according to claim 1, wherein an amount of power produced at an angular rotation speed above the rated angular rotation speed is higher than an amount of power produced at the rated angular rotation speed.

5. The method according to claim 3, wherein in the extended mode the angular rotation speed of the wind turbine rotor is limited below an angular rotation speed threshold,
wherein the angular rotation speed threshold is larger than the rated angular rotation speed of the wind turbine.

6. The method according to claim 5, wherein the angular rotation speed threshold is:
inversely proportional to the estimated erosion rate, or
set so as to maintain a constant erosion rate, or
set according to a pre-calculated lookup table relating estimated erosion rate and maximum tip speed, or
set according to a maximum corresponding structural load, or
set according to a noise level.

7. The method according to claim 5, wherein said angular rotation speed threshold is more than 102% with respect to the rated angular rotation speed.

8. The method according to claim 1, wherein the information on ambient conditions further comprises information on one or more of:
solid particles in air surrounding the wind turbine,
liquid particles in air surrounding the wind turbine, or
humidity.

9. The method according to claim 1, wherein the information on ambient conditions further comprises information on hailstones impinging on the one or more blades or being likely to impinge on the one or more blades.

10. The method according to claim 1, wherein obtaining said information comprises:
receiving data from:
a precipitation sensor selected from:
an optical rain gauge, and
an acoustic rain gauge; or
a humidity sensor configured to perform at least one of:
receive a weather report,
receive a weather forecast, and
receive data or a forecast from another wind turbine, a substation, or a remote control center.

11. The method according to claim 1, wherein the method further comprises:
controlling the angular rotation speed according to the extended mode,
subsequently obtaining subsequent information on ambient conditions, which information enables estimating a subsequently estimated erosion rate,
subsequently estimating, based on said subsequent information, the subsequently estimated erosion rate, and
discontinuing controlling the wind turbine according to the extended mode if the subsequently estimated erosion rate is above a predetermined erosion rate level.

12. The method according to claim 1, wherein said wind turbine further comprises:
a pitch control system for controlling a pitch angle of the one or more blades,
and wherein the method further comprises:
controlling the angular rotation speed by controlling the pitch angle of the one or more blades with the pitch control system.

13. A computer program product comprising a non-transitory computer-readable medium having instructions stored thereon which, when executed by one or more processors, cause a control system for a wind turbine to perform an operation, wherein the wind turbine comprises a wind turbine rotor with one or more blades, wherein the wind turbine has a rated angular rotation speed of the wind turbine rotor; the operation, comprising:
obtaining information on ambient conditions comprising information on rain drops impinging on the one or more blades or information on rain drops being likely to impinge on the one or more blades,
determining that an erosion criterion is fulfilled when a physical characteristic of said rain drops satisfies a predetermined threshold, and
controlling the wind turbine according to an extended mode upon determining the erosion criterion is fulfilled, wherein in the extended mode, an angular rotation speed of the wind turbine rotor is allowed to exceed the rated angular rotation speed.

14. The computer program product according to claim 13, wherein the physical characteristic is
an average drop size of the rain drops.

15. The computer program product according to claim 13, wherein the information on ambient conditions enables estimating an estimated erosion rate, and wherein the operation further comprises:
estimating, based on the obtained information, the estimated erosion rate,
determining that the erosion criterion is fulfilled if the estimated erosion rate is below a predetermined erosion rate threshold.

16. The computer program product according to claim 13, wherein an amount of power produced at an angular rotation speed above the rated angular rotation speed is higher than an amount of power produced at the rated angular rotation speed.

17. The computer program product according to claim 13, wherein in the extended mode the angular rotation speed of the wind turbine rotor is limited below an angular rotation speed threshold, wherein the angular rotation speed threshold is larger than the rated angular rotation speed of the wind turbine.

18. A wind turbine, comprising:
a tower;
a nacelle disposed on the tower;
a rotor extending from the nacelle, wherein the wind turbine has a rated angular rotation speed of the rotor;
a plurality of blades disposed on one end of the rotor; and
a control system configured to perform an operation, the operation comprising:
   obtaining information on ambient conditions comprising information on rain drops impinging on one of the plurality of blades or information on rain drops being likely to impinge on the one of the plurality of blades,
   determining that an erosion criterion is fulfilled when a physical characteristic of said rain drops satisfies a predetermined threshold, and
   controlling the wind turbine according to an extended mode upon determining the erosion criterion is fulfilled, wherein in the extended mode, an angular rotation speed of the rotor is allowed to exceed the rated angular rotation speed.

19. The wind turbine of claim 18, wherein obtaining the information comprises receiving information from:
a precipitation sensor selected from:
   an optical rain gauge, and
   an acoustic rain gauge; or
a humidity sensor configured to perform at least one of:
   receive a weather report,
   receive a weather forecast, and
   receive data or a forecast from another wind turbine, a substation, or a remote control center.

20. The wind turbine according to claim 18, wherein the physical characteristic is
an average drop size of the rain drops.

* * * * *